(12) United States Patent
Gimvang

(10) Patent No.: US 8,075,679 B2
(45) Date of Patent: Dec. 13, 2011

(54) CORROSION AND ABRASION RESISTANT COATING

(75) Inventor: Bo H. Gimvang, South Daytona, FL (US)

(73) Assignee: Xurex, Inc., Albuquerque, NM (US)

( * ) Notice: Subject to any disclaimer, the term of this patent is extended or adjusted under 35 U.S.C. 154(b) by 161 days.

(21) Appl. No.: 12/386,688

(22) Filed: Apr. 22, 2009

(65) Prior Publication Data

US 2009/0209689 A1     Aug. 20, 2009

Related U.S. Application Data

(63) Continuation-in-part of application No. 12/288,745, filed on Oct. 23, 2008.

(60) Provisional application No. 60/983,147, filed on Oct. 26, 2007, provisional application No. 60/983,151, filed on Oct. 26, 2007, provisional application No. 61/039,785, filed on Mar. 26, 2008, provisional application No. 61/040,407, filed on Mar. 28, 2008, provisional application No. 61/046,362, filed on Apr. 18, 2008.

(51) Int. Cl.
*C23F 11/00*     (2006.01)
*C08K 5/5419*    (2006.01)

(52) U.S. Cl. ............... 106/14.05; 106/14.41; 106/14.42; 106/14.43; 106/14.44; 524/261

(58) Field of Classification Search ............... 106/14.05, 106/14.41, 14.42, 14.43, 14.44; 524/261
See application file for complete search history.

(56) References Cited

U.S. PATENT DOCUMENTS

| 4,182,732 A | | 1/1980 | Fry |
| 4,374,158 A | * | 2/1983 | Taniguchi et al. ............ 427/536 |
| 5,013,788 A | * | 5/1991 | Nagashima et al. .......... 524/767 |
| 5,580,819 A | * | 12/1996 | Li et al. ......................... 427/167 |
| 5,688,851 A | | 11/1997 | Kress |
| 5,800,926 A | * | 9/1998 | Nogami et al. ............... 428/447 |
| 6,348,269 B1 | * | 2/2002 | Terry ............................. 428/447 |
| 6,361,871 B1 | * | 3/2002 | Jenkner et al. ................ 428/447 |
| 6,432,191 B2 | * | 8/2002 | Schutt ....................... 106/287.13 |
| 6,451,382 B2 | * | 9/2002 | Schutt et al. .................. 427/387 |
| 6,538,092 B1 | * | 3/2003 | Terry et al. ...................... 528/26 |
| 6,685,766 B2 | * | 2/2004 | Standke et al. ............ 106/14.41 |
| 6,695,904 B2 | * | 2/2004 | Burger et al. ............ 106/287.14 |
| 2001/0056141 A1 | * | 12/2001 | Schutt ............................ 524/261 |
| 2004/0097646 A1 | * | 5/2004 | Terry et al. .................... 524/837 |
| 2006/0070551 A1 | | 4/2006 | Kanamori et al. |

FOREIGN PATENT DOCUMENTS

| WO | WO 02/100151 | 12/2002 |
| WO | WO 03/022462 | 3/2003 |

* cited by examiner

*Primary Examiner* — Robert Loewe
(74) *Attorney, Agent, or Firm* — Thomas C. Saitta

(57) ABSTRACT

A corrosion and abrasion resistant coating composition with at least one alkoxy siloxane and preferably at least three alkoxy siloxanes, wherein the total amount of alkoxy siloxanes in the composition is greater than approximately 70 wt %, an anti-corrosion agent effective in acid and salt environments, a hydrolysable catalyst, an adhesion promoter, and a flow/leveling agent.

5 Claims, No Drawings

CORROSION AND ABRASION RESISTANT COATING

This patent application is a continuation-in-part of U.S. patent application Ser. No. 12/288,745, filed Oct. 23, 2008.

To the extent possible, this patent application claims the benefit of U.S. Provisional Patent Application Ser. No. 60/983,147, filed Oct. 26, 2007, U.S. Provisional Patent Application Ser. No. 60/983,151, filed Oct. 26, 2007, U.S. Provisional Patent Application Ser. No. 61/039,785, filed Mar. 26, 2008, U.S. Provisional Patent Application Ser. No. 61/040,407, filed Mar. 28, 2008, and U.S. Provisional Patent Application Ser. No. 61/046,362, filed Apr. 18, 2008.

BACKGROUND OF THE INVENTION

This invention relates generally to the field of surface modifiers and coatings for various substrates, and in particular to such treatments and coatings that minimize or eliminate the degradation effects of corrosion and abrasion on the substrate, thereby greatly increasing the useful life of the substrate.

Applying, adhering or bonding surface modifiers or coatings to various substrates and surfaces, such as for example metal, plastics, ceramics, concrete, wood, laminates and the like, is well known. The term surface modifier is generally applied to coatings that are less than 0.5 microns, and for purposes herein this disclosure, the term "coating" shall be used to cover any generally accepted thicknesses of surface modifiers and coatings. A basic example is the application of paint to a surface exposed to sun, rain, wind, etc. Another example of circumstances wherein coatings are frequently used is for surfaces that encounter degradation from continuous or frequent contact with moving objects or particles entrained in liquid or gas flows.

One critical factor in the effectiveness and useful life of a coating is the degree of adhesion between the surface modifier or coating and the substrate or surface. Increasing the degree of adhesion is accomplished by proper matching of coating composition to substrate composition, and/or by advance surface preparation of the substrate, and/or by applying an intermediate layer between the substrate and the coating. Another critical factor in the effectiveness and useful life of a coating is the hardness, corrosion resistance and abrasion resistance of the coating itself. Increasing these desirable qualities is a result of properly choosing the composition of the coating to enhance these characteristics. For example, it is well known to increase the hardness, corrosion and scratch resistance of polyurethane or paint coatings by mixing in small amounts, usually well below 2 wt %, of coupling or cross-linking agents, such as for example alkoxy siloxanes. Larger amounts of these additives are not utilized as they will result in excessive cross-linking that renders the paint unusable.

Contrary to the wisdom of the current state of the coating art as to the well-accepted limitations for the utilization of alkoxy siloxanes as cross-linking additives in coating applications, coatings having highly beneficial properties relative to corrosion resistance and abrasion resistance have been formulated that instead utilize large percentages of alkoxy siloxanes. It is an object of this invention to provide coatings having significantly large percentages of alkoxy siloxanes, preferably having at least two alkoxy siloxanes in the composition, that result in hard, durable, corrosion resistant and abrasion resistant coatings that can be applied to various types of substrates and surfaces. This object and additional objects not expressly stated will be apparent upon examination of the disclosure herein.

SUMMARY OF THE INVENTION

In general, the invention is a coating composition for various substrates or surfaces that is hard, durable, corrosion resistant and abrasive resistant, as well as methods for applying the coating to the substrate to maximize the beneficial effects.

In one embodiment, the coating composition consists essentially of:

at least two alkoxy siloxanes, wherein said total amount of said alkoxy siloxanes in said composition is greater than approximately 70 wt %, and wherein said alkoxy siloxanes are chosen from the group of alkoxy siloxanes consisting of methyltrimethoxysilane, methyltriethoxysilane, methyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, n-phenylaminopropyl trimethoxysilane, 3-(meth) acryloxypropyl triethoxysilane, 3-aminopropyl triethoxysilane, 3-mercaptopropyl trimethoxysilane, polydiethoxysiloxane, and fluoropropyl triethoxysilane;

a hydrolysable catalyst, wherein said catalyst is chosen from the group of catalysts consisting of titanium alcoholates, titanium alkanols, titanium tetraisopropoxide, titanium tetrabutoxide, aluminum titanate, aluminum zirconate, magnesium aluminate, magnesium titanate, magnesium zirconate, tetrabutoxytitanate, and titanium isopropoxide;

an adhesion promoter, wherein said adhesion promoter is chosen from the group of adhesion promoters consisting of gamma-glycidoxypropyltrimethoxysilane and gamma-methacryloxypropyltrimethoxysilane; and a flow/leveling agent, wherein said flow/leveling agent is a polydimethylsiloxane.

Preferably, the total amount of said catalyst in said composition is less than approximately 5.0 wt %; and wherein the total amount of said adhesion promoter in said composition is less than approximately 2.5 wt %; and wherein the total amount of said flow-leveling agent in said composition is less than approximately 1 wt %.

In another embodiment, the coating composition consists essentially of:

at least two alkoxy siloxanes, wherein said total amount of said alkoxy siloxanes in said composition is greater than approximately 70 wt %, and wherein said alkoxy siloxanes are chosen from the group of alkoxy siloxanes consisting of methyltrimethoxysilane, methyltriethoxysilane, ethyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, phenyl triethoxysilane, n-pheriylaminopropyl trimethoxysilane, 3-(meth) acryloxypropyl triethoxysilane, 3-aminopropyl triethoxysilane, 3-mercaptopropyl trimethoxysilane, polydiethoxysiloxane, and fluoropropyl triethoxysilane;

an alcohol chosen from the group of alcohols consisting of isopropyl and ethyl alcohol;

a hydrolysable catalyst, wherein said catalyst is chosen from the group of catalysts consisting of the combination of deionized water, an acid chosen from the group of acids consisting of phosphoric acid, boric acid and glacial acetic acid; and a metal oxide chosen from the group of metal oxides consisting of zinc oxide, magnesium oxide and calcium oxide;

an adhesion promoter, wherein said adhesion promoter is chosen from the group of adhesion promoters consisting of gamma-glycidoxypropyltrimethoxysilane and gamma-methacryloxypropyltrimethoxysilane; and a flow/leveling agent, wherein said flow/leveling agent is a dimethyl siloxane.

In still another embodiment, the coating composition consists essentially of:

at least three alkoxy silanes, wherein said total amount of said alkoxy silanes in said composition is greater than approximately 70 wt %, and wherein said alkoxy silanes are chosen from the group of alkoxy silanes consisting of methyltrimethoxysilane, methyltriethoxysilane, methyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, n-phenylaminopropyl trimethoxysilane, 3-(meth) acryloxypropyl triethoxysilane, 3-aminopropyl triethoxysilane, 3-mercaptopropyl trimethoxysilane, and fluoropropyl triethoxysilane;

a hydrolysable catalyst, wherein said catalyst is chosen from the group of catalysts consisting of titanium alcoholates, titanium alkanols, titanium tetraisopropoxide, titanium tetrabutoxide, aluminum titanate, aluminum zirconate, magnesium aluminate, magnesium titanate, magnesium zirconate, tetrabutoxytitanate, and titanium isopropoxide;

a flow/leveling agent;

an adhesion promoter;

an anti-corrosion agent particularly effective in acid and salt environments, wherein said anti-corrosion agent is preferably chosen from the group of anti-corrosion agents consisting of heptadecafluorodecyltrimethoxysilane and tridecafluorooctyltriethoxysilane;

and optionally, a partially hydrolyzed ethyl silicate, such as polydiethxysiloxane.

Also disclosed is a coating method comprising the steps of:

providing a surface cleaner and activation composition consisting essentially of deionized water, an acid, an alcohol and an adhesion promoter consisting of an aminofunctional silane;

applying said surface cleaner and activation composition to said substrate;

rinsing said substrate and allowing said substrate to dry;

providing a coating composition consisting essentially of at least one alkoxy siloxane, wherein said total amount of alkoxy siloxane in said coating composition is greater than approximately 70 wt %, a hydrolysable catalyst, an adhesion promoter, and a flow/leveling agent; and applying said coating composition to said substrate.

DETAILED DESCRIPTION OF THE INVENTION

The invention will now be described in detail with regard for the best mode and the preferred embodiments. In general, the invention is a coating composition for various substrates or surfaces that is hard, durable, corrosion resistant and abrasive resistant, as well as methods for applying the coating to the substrate to maximize the beneficial effects. In general, the invention is a coating that consists essentially of relatively large amounts by wt % of alkoxy siloxanes, along with a catalyst and minor amounts of adhesion promoting and flow/leveling additives. The coating may be applied to various substrates or surfaces, including but not limited to metals, plastics, ceramics, wood, composites, laminates and similar surfaces or substrates.

The coating composition consists essentially of at least one alkoxy siloxane, a hydrolysable catalyst, an adhesion promoter, and a flow/leveling agent, wherein the total amount of the alkoxy siloxane component in coating composition is greater than approximately 70 wt %. Preferably, the coating composition consists essentially of at least two alkoxy siloxanes, wherein the at least two alkoxy siloxanes are chosen not only on the basis of imparting desirable properties to the coating relative to hardness, appearance, corrosion resistance and abrasion resistance, but also on the basis of mixing and curing compatibility. For example, certain alkoxy siloxanes may dramatically increase hardness, water resistance, penetration or the like, but will severely slow the cross-linking and curing time of the composition, and therefore must be used in relatively small amounts when reasonable curing times are desired. Preferably, the alkoxy siloxanes are alkyl alkoxy or aryl alkoxy siloxanes. For example, the alkoxy siloxanes may consist of one or more of methyltrimethoxysilane, methyltriethoxysilane, methyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, n-phenylaminopropyl trimethoxysilane, 3-(meth) acryloxypropyl triethoxysilane, 3-aminopropyl triethoxysilane, 3-mercaptopropyl trimethoxysilane, polydiethoxysiloxane, and fluoropropyl triethoxysilane.

The coating composition further includes a hydrolysable catalyst. In one embodiment, the catalyst is a titanate or zirconate, such as for example titanium alcoholates, titanium alkanols, titanium tetraisopropoxide, titanium tetrabutoxide, aluminum titanate, aluminum zirconate, magnesium aluminate, magnesium titanate, magnesium zirconate, tetrabutoxytitanate, and titanium isopropoxide, alone or in combination. The total amount of this catalyst in the coating composition is less than approximately 5 wt %. In a second embodiment, the coating composition further consists of an alcohol, such as for example isopropyl or ethyl alcohol, and the catalyst consists essentially of the combination of deionized water, an acid, such as for example phosphoric acid, boric acid and glacial acetic acid, alone or in combination, and a metal oxide, such as for example zinc oxide, magnesium oxide and calcium oxide, alone or in combination, such that in combination the water, acid and metal oxide form an acidic aqueous dispersion containing a minor amount of a divalent metal cation. The total amount of this catalyst in the coating composition is less than approximately 30 wt %.

The coating composition further includes an adhesion promoter additive to increase adhesion of the coating to the substrate. Preferably, the adhesion promoter is chosen from the group of adhesion promoters consisting of gamma-glycidoxypropyltrimethoxysilane and gamma-methacryloxypropyltrimethoxysilane, and preferably the total amount of said adhesion promoter in the coating composition is less than approximately 2.5 wt %.

The coating composition further includes a flow/leveling agent additive. Preferably, the flow/leveling agent is a dimethyl siloxane, wherein the total amount of said flow-leveling agent in said composition is less than approximately 1 wt %.

Preferably the coating composition is formulated and mixed in two parts for storage and transportation purposes, such that cross-linking and curing is precluded until the two parts are mixed. For example, the alkoxy siloxanes are first mixed together and then the adhesion promoter and flow/leveling agents are mixed in, with the catalyst component added in only when the substrate coating application process is begun. Most preferably, the components are stored and the coating process is performed in an inert or non-reactive gas, such as nitrogen. To increase penetration of the coating composition into the substrate and to reduce cross-linking and curing time, the substrate, the coating composition or both may be heated such as in the range of from approximately 120 to 170 degrees F. The coating composition may be applied in various known ways, including but not limited to brushing, spraying, rolling, wiping, and immersing.

In a third embodiment, the coating composition consists essentially of:

at least three alkoxy silanes, wherein said total amount of said alkoxy silanes in said composition is greater than approximately 70 wt %, and more preferably greater than 85 wt %, and wherein said alkoxy silanes are chosen from the group of alkoxy silanes consisting of methyltrimethoxysilane, methyltriethoxysilane, methyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, n-phenylaminopropyl trimethoxysilane, 3-(meth) acryloxypropyl triethoxysilane, 3-aminopropyl triethoxysilane, 3-mercaptopropyl trimethoxysilane, and fluoropropyl triethoxysilane;

a hydrolysable catalyst, wherein said catalyst is chosen from the group of catalysts consisting of titanium alcoholates, titanium alkanols, titanium tetraisopropoxide, titanium tetrabutoxide, aluminum titanate, aluminum zirconate, magnesium aluminate, magnesium titanate, magnesium zirconate, tetrabutoxytitanate, and titanium isopropoxide;

a flow/leveling agent, wherein said flow/leveling agent is preferably a dimethyl siloxane;

an adhesion promoter, such as for example bistriethoxysilylethane;

an anti-corrosion agent particularly effective in acid and salt environments, wherein said anti-corrosion agent is chosen from the group of anti-corrosion agents consisting of heptadecafluorodecyltrimethoxysilane and tridecafluorooctyltriethoxysilane;

and optionally, a partially hydrolyzed ethyl silicate, such as for example polydiethoxysiloxane, when abrasion-resistance and gloss enhancement is important.

As an example of this third embodiment, the three alkoxy siloxanes consist of methyltrimethoxysilane, phenyl trimethoxysilane and 3-aminopropyl triethoxysilane, the catalyst consists of a titanate or zirconate, the flow/leveling agent consists of a combination of dimethyl siloxane and polydimethylsiloxane terminated.

Preferably, the substrate surface is prepared prior to coating by applying a cleaning or etching solution and primer. Most preferably, the coating is applied by providing a surface cleaner and activation composition that leaves functional acid sites on the substrate, such as for example a composition consisting essentially of deionized water, an acid, such as for example glacial acetic acid or phosphoric acid, an alcohol, such as for example isopropyl alcohol, and an adhesion promoter consisting of an aminofunctional silane, such as for example aminopropylaminoethylsilane or aminoethylaminopropyltrimethoxy, applying the surface cleaner and activation composition to the substrate, rinsing the substrate and allowing the substrate to dry, then applying the coating composition to the substrate.

The coating composition has been found to result in very deep penetration into the substrate and has significantly increased the life of substrates in high abrasion, high corrosion applications.

It is contemplated that equivalents and substitutions for certain elements and steps set forth above may be obvious to those of ordinary skill in the art, and therefore the true scope and definition of the invention is to be as set forth in the following claims.

I claim:

1. A coating composition consisting essentially of:
   at least three alkoxy silanes, wherein said total amount of said alkoxy silanes in said composition is greater than approximately 70 wt %, and wherein said alkoxy silanes are chosen from the group of alkoxy silanes consisting of methyltrimethoxysilane, methyltriethoxysilane, ethyltrimethoxysilane, ethyltriethoxysilane, isopropyl trimethoxysilane, isopropyl triethoxysilane, n-butyl trimethoxysilane, isobutyl trimethoxysilane, phenyl trimethoxysilane, phenyl triethoxysilane, n-phenylaminopropyl trimethoxysilane, 3-(meth)acryloxypropyl triethoxysilane, 3-aminopropyl triethoxysilane, 3-mercaptopropyl trimethoxysilane, and fluoropropyl triethoxysilane;
   an anti-corrosion agent effective in acid and salt environments, wherein said anti-corrosion agent is chosen from the group of anti-corrosion agents consisting of heptadecafluorodecyltrimethoxysilane and tridecafluorooctyltriethoxysilane;
   a hydrolysable catalyst, wherein said catalyst is chosen from the group of catalysts consisting of titanium alcoholates, titanium alkanols, titanium tetraisopropoxide, titanium tetrabutoxide, aluminum titanate, aluminum zirconate, magnesium aluminate, magnesium titanate, magnesium zirconate, tetrabutoxytitanate, and titanium isopropoxide;
   an adhesion promoter, wherein said adhesion promoter is bistriethoxysilylethane; and
   a flow/leveling agent, wherein said flow/leveling agent is a polydimethylsiloxane.

2. The composition of claim 1, wherein the total amount of said catalyst in said composition is less than approximately 5.0 wt %; and wherein the total amount of said adhesion promoter in said composition is less than approximately 2.5 wt %; and wherein the total amount of said flow-leveling agent in said composition is less than approximately 3.0 wt %.

3. The composition of claim 2, wherein said at least three alkoxy silanes consist of methyltrimethoxysilane, phenyl trimethoxysilane and 3-aminopropyl triethoxysilane.

4. The composition of claim 1, further consisting essentially of a partially hydrolyzed ethyl silicate.

5. The composition of claim 4, wherein said partially hydrolyzed ethyl silicate is a polydiethoxysiloxane.

* * * * *